United States Patent
Chen et al.

(10) Patent No.: US 9,175,777 B2
(45) Date of Patent: Nov. 3, 2015

(54) FLOW CONTROLLER

(71) Applicants: Jun-Chien Chen, Taichung (TW);
Chien-Yu Liu, Taichung (TW)

(72) Inventors: Jun-Chien Chen, Taichung (TW);
Chien-Yu Liu, Taichung (TW)

(*) Notice: Subject to any disclaimer, the term of this patent is extended or adjusted under 35 U.S.C. 154(b) by 0 days.

(21) Appl. No.: 14/575,847

(22) Filed: Dec. 18, 2014

(65) Prior Publication Data

US 2015/0102250 A1   Apr. 16, 2015

Related U.S. Application Data

(63) Continuation-in-part of application No. 13/804,535, filed on Mar. 14, 2013.

(51) Int. Cl.
*F16K 1/22* (2006.01)
*F16K 1/226* (2006.01)

(52) U.S. Cl.
CPC ............... *F16K 1/2261* (2013.01); *F16K 1/222* (2013.01)

(58) Field of Classification Search
CPC .................................................. F16K 1/2261
USPC .................................... 251/305, 306; 123/337
See application file for complete search history.

(56) References Cited

U.S. PATENT DOCUMENTS

| 1,962,097 | A | | 1/1934 | Schmidt |
| 3,111,325 | A | * | 11/1963 | Reiling .......................... 264/127 |
| 3,572,632 | A | * | 3/1971 | Bengtsson .................... 251/306 |
| 4,083,529 | A | | 4/1978 | Santy et al. |
| 4,176,675 | A | | 12/1979 | Liberman |
| 5,160,118 | A | | 11/1992 | Stary |
| 6,390,060 | B1 | | 5/2002 | Schröder |
| 2002/0162983 | A1 | | 11/2002 | Bailey |
| 2007/0194265 | A1 | | 8/2007 | Shenk |
| 2009/0050106 | A1 | | 2/2009 | Bessho |
| 2010/0148106 | A1 | | 6/2010 | Whitefield |
| 2012/0267557 | A1 | | 10/2012 | Lockwood et al. |

* cited by examiner

*Primary Examiner* — John Fox
*Assistant Examiner* — Reinaldo Sanchez-Medina
(74) *Attorney, Agent, or Firm* — Muncy, Geissler, Olds & Lowe, P.C.

(57) ABSTRACT

A flow controller is provided. The controller includes a shell body, a first supporting member, a driving shaft and an elliptical valve. The shell body has a passage passed therethrough. The first supporting member is assembled to the shell body. The driving shaft is assembled to the first supporting member. The elliptical valve is pivotally assembled in the passage and is connected with the driving shaft. The elliptical valve is rotated by the driving shaft for opening or closing the passage. When the passage is closed by the elliptical valve, the elliptical valve tightly abuts against an inner circular wall of the shell body for completely closing the passage, so that the controller is suitable in a high temperature and high pressure environment.

10 Claims, 6 Drawing Sheets

FLOW CONTROLLER

FIELD OF THE INVENTION

The present invention is a CIP of application Ser. No. 13/804,535, filed Mar. 14, 2013, the entire contents of which are hereby incorporated by reference.

BACKGROUND OF THE INVENTION

Description of the Prior Art

A butterfly valve is broadly applied in industry. The butterfly valve comprises a shell. The shell has a blocking plate assembled thereto. The blocking plate has a rubber or plastic washer assembled thereon for providing a sealing function.

However, the temperature and the pressure of an air or liquid are very high in a working environment. When the washer works in the working environment, the rubber or plastic washer would be deformed seriously, so that the washer cannot seal a gap between the shell and the blocking plate completely. Thereafter, the washer would escape from the blocking plate, and the air or liquid would diffuse from one side of the butterfly valve to another side of the butterfly valve.

Furthermore, the rubber or plastic washer would be metamorphosed by a strong acid or base in the working environment, so that the metamorphosed washer would pollute the air or liquid in the shell.

U.S. Pat. No. 5,160,118 discloses that the vale is circular but, obviously, not elliptical. The circular valve has two axes perpendicular to each other and having the same length. Every length along each of the axes of the circular valve is equal to an inner diameter of the element. Additionally, Stary discloses that when the circular valve is rotated to close the passage, the circular valve is parallel and overlaps with a radial cross-section of the element. In fact, the circular valve is impossible to close the passage in a manner that the circular valve is tilted with respect to the radial cross-section of the element since the vale is circular. Therefore, the circular valve can close the passage only when the circular valve is parallel and overlaps with the radial cross-section of the element, and thus liquid can possibly leak between the circular valve and the inner wall of the element easily, especially as the circular valve and/or the inner wall of the element deform, contract or expand unequivalently.

U.S. Pat. No. 6,390,060 discloses a throttle valve for controlling air flow to an internal combustion engine in which a throttle valve body is mounted in an intake channel to control air flow through the intake channel to the internal combustion engine. The throttle body is integrally formed in one piece, and no detachable and flexible sealing member disposed around the throttle body, so that it has a poor sealing effect (not changeable in diameter). Therefore, liquid can possibly leak between the circular valve and the inner wall of the element easily, especially as the throttle body and/or the inner wall of the channel deform, contract or expand unequivalently.

The present invention is, therefore, arisen to obviate or at least mitigate the above mentioned disadvantages.

SUMMARY OF THE INVENTION

An object of the present invention is to provide an improved flow controller, in which the flow controller is optimized for sealing and is suitable in a high temperature and high pressure environment.

To achieve the above and other objects, a flow controller comprises a shell body, a first supporting member, a driving shaft and an elliptical valve.

The shell body has an inner circular wall and an outer circular wall. A passage is surrounded by the inner circular wall. The first supporting member is assembled to the shell body. The first supporting member has an axle hole opened therethrough. The axle hole communicates with the passage.

The driving shaft is pivotally received into the axle hole.

The elliptical valve is pivotally assembled in the passage and is connected with the driving shaft. The elliptical valve includes a baffle plate and a sealing arrangement. The baffle plate is elliptical and has a periphery, and the sealing arrangement includes a plurality of the connectors and an elastic member. The elastic member is a Teflon ring member, the connectors are detachably disposed annularly on two peripheral edges of two corresponding sides of the baffle plate, the connectors are protrusive radially out of the baffle plate, the connectors and the baffle plate form a annular receiving recess, and the elastic member is disposed annularly within the receiving recess and protrusive radially out of the connectors.

The elliptical valve is rotated by the driving shaft for opening or closing the passage.

Wherein, when the passage is closed by the elliptical valve, the elliptical valve tightly abuts against the inner circular wall of the shell body for completely closing the passage, so that the controller is optimized for sealing and is suitable in a high temperature and high pressure environment.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
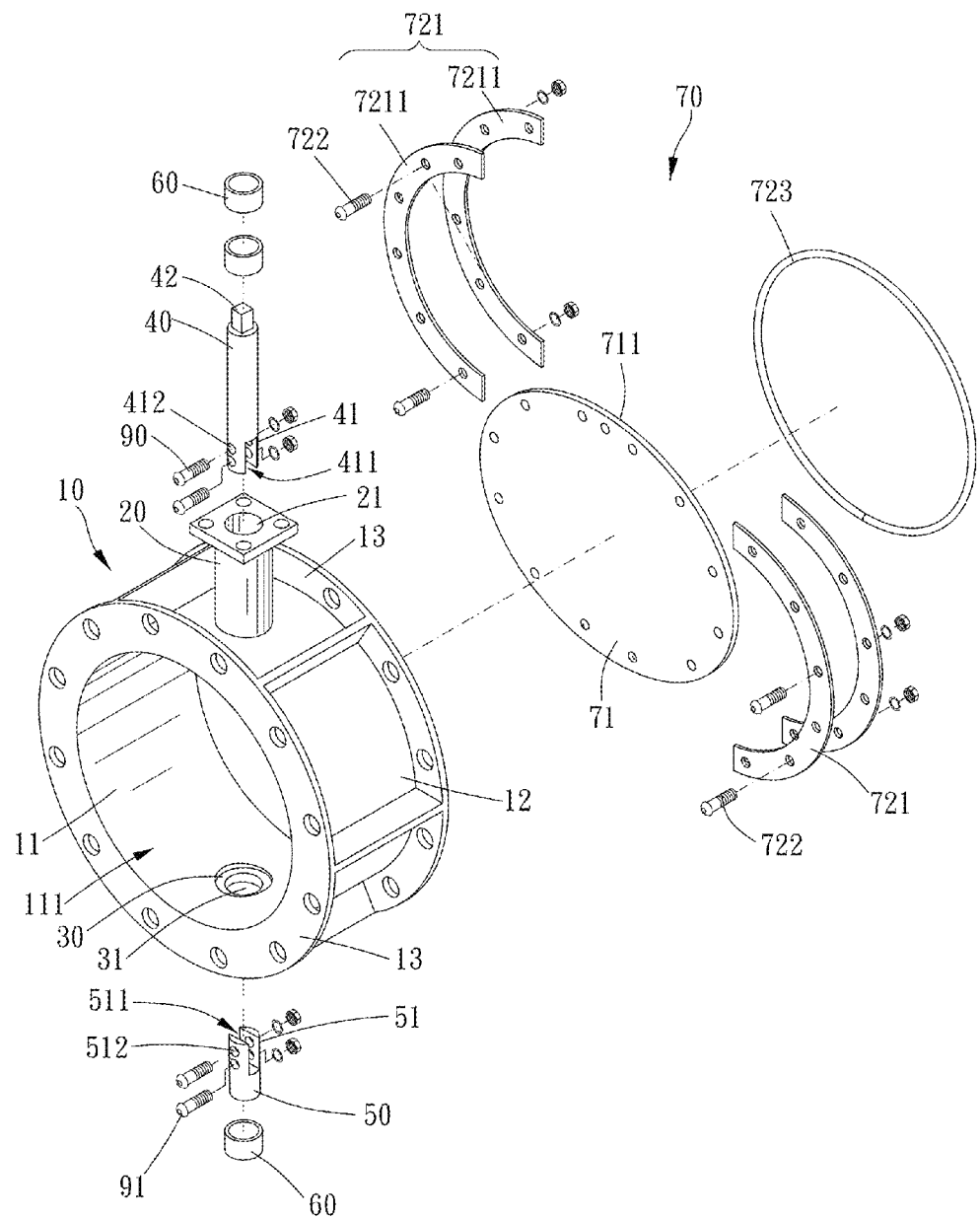
FIG. 1 is an exploded perspective view of a flow controller according to a preferred embodiment of the present invention.
Figure 2:
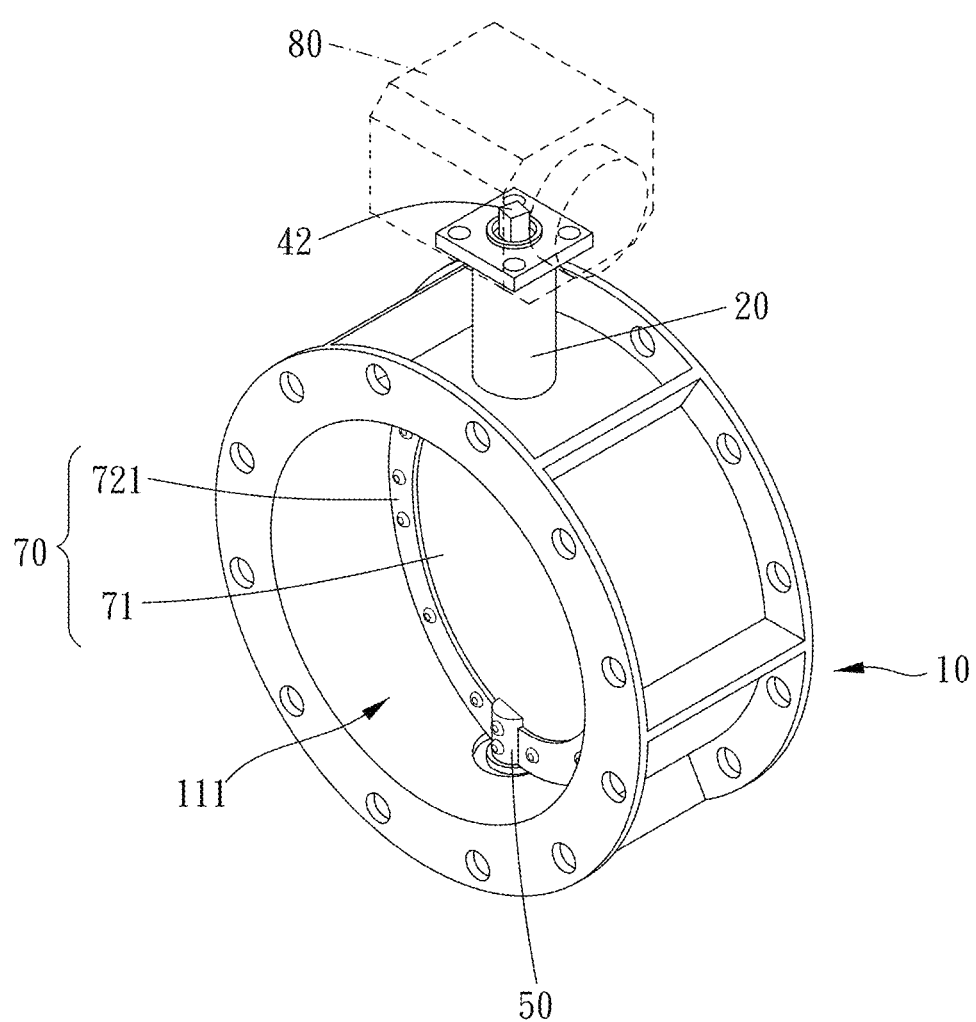
FIG. 2 is a perspective view of the present invention.
Figure 3:
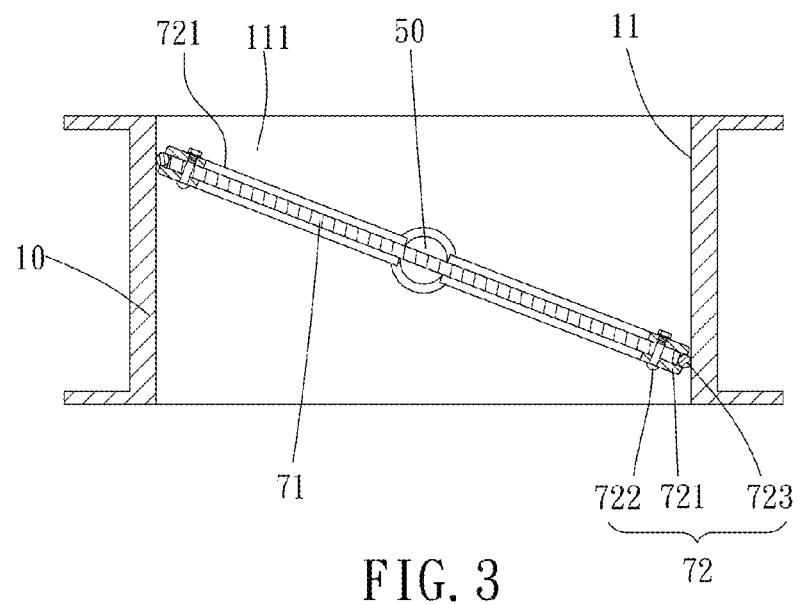
FIG. 3 is a cross-sectional view of the present invention for showing a passage is closed by an elliptical valve.
Figure 3A:
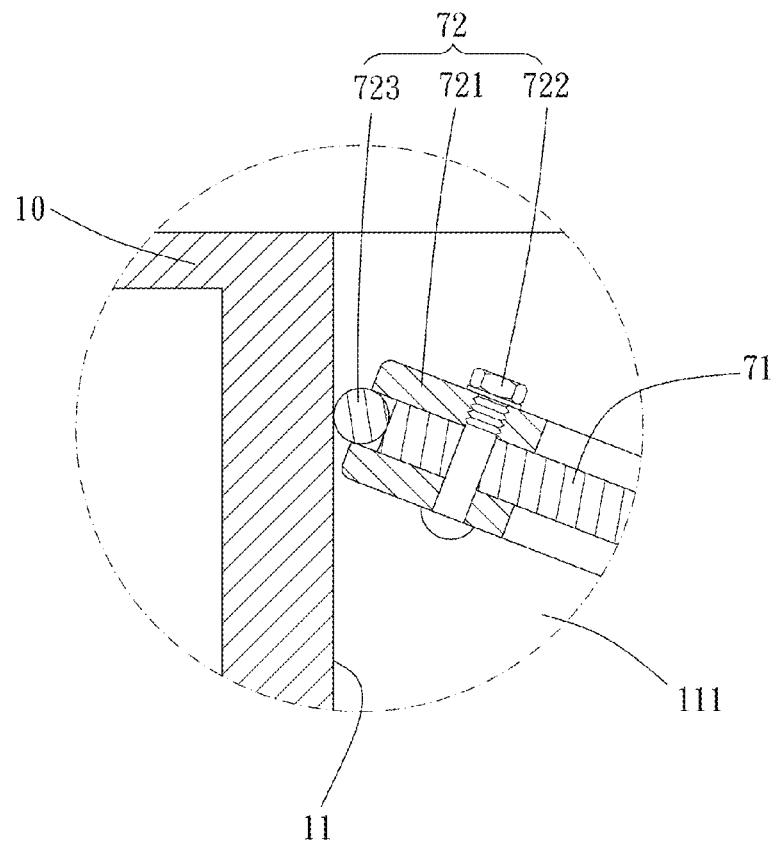
FIG. 3A is an enlarged view of FIG. 3 of the present invention for showing a sealing arrangement.

FIGS. 1-3 show a flow controller according to a preferred embodiment of the present invention. The controller comprises a shell body 10, a first supporting member 20, a second supporting member 30, a driving shaft 40, a supporting shaft 50, three shaft bushes 60 and an elliptical valve 70.

The shell body 10 is made of metallic material. The shell body 10 has an inner circular wall 11 and an outer circular wall 12. A passage 111 is surrounded by the inner circular wall 11. The shell body 10 has a first hole and a second hole which are coaxial. The first hole and the second hole are respectively passed through the inner circular wall 11 and the outer circular wall 12 and both communicate with the passage 111. Two flanges 13 are respectively formed at two lateral sides of the shell 10. Referring to FIG. 2, each flange 13 connects to a tube, but the flange 13 is not necessary for the shell body 10 in other embodiment of the present invention.

The first supporting member 20 is assembled into the first hole. The first supporting member 20 has an axle hole 21 opened therethrough. The axle hole 21 communicates with the passage 111.

The second supporting member 30 is assembled into the second hole. The second supporting member 30 has a through hole 31 opened therethrough. The through hole 31 communicates with the passage 111. The axle hole 21 and the through hole 31 are coaxial.

The driving shaft 40 is pivotally received into the axle hole 21. A bottom end of the driving shaft 40 is extended to the passage 111. Two first blocks 41 are formed on the bottom end of the driving shaft 40. A first recess 411 is defined between the two first blocks 41. A plurality of first screw holes 412 is opened on each first block 41 and communicates with the first recess 411. A rectangular driving end 42 is formed on a top end of the driving shaft 40. The driving end 42 engages with a working shaft of a driving apparatus 80. Referring to FIG. 2, the driving apparatus 80 is an air pressure valve.

The supporting shaft 50 is pivotally received into the through hole 31 of the second supporting member 30. The supporting shaft 50 is opposite to the driving shaft 40. A top end of the supporting shaft 50 is extended to the passage 111. Two second blocks 51 are formed on the top end of the supporting shaft 50. A second recess 511 is defined between the two second blocks 51. A plurality of second screw holes 512 is opened on each second block 51 and communicates with the second recess 511.

The driving shaft 40 is sleeved by two shaft bushes 60 which are received into the axle hole 21 of the first supporting member 20. The supporting shaft 50 is sleeved by the one shaft bush 60 which is received into the through hole 31 of the second supporting member 30.

The elliptical valve 70 is pivotally assembled in the passage 111 and is connected with the driving shaft 40 and the supporting shaft 50. The elliptical valve 70 has a long axis and a short axis defined thereon. A length along the short axis of the elliptical valve 70 is equal to a diameter of the shell body 10, so that an edge along the short axis of the elliptical valve 70 can abut against the inner circular wall 11 of the shell body 10 when the elliptical valve 70 is rotated. The elliptical valve 70 has a baffle plate 71 and a sealing arrangement 72. The baffle plate 71 is made of metallic material and is formed as an elliptical shape. A periphery 711 is formed around the baffle plate 71. The sealing arrangement 72 has two connectors 721 which are made of metallic material. The two connectors 721 are both assembled to the periphery 711 of the baffle plate 71 and are detachable. The sealing arrangement 72 comprises a plurality of fasteners 722. Each connector comprises two plates 7211. The plate 7211 is formed as a half-elliptical shape, so that the connector 721 is constructed by the two plates 7211. The plates 7211 are connected to the baffle plate 71 by the fasteners 722. A first gap is formed between each two connectors 721 at one top end of the baffle plate 71. A second gap is formed between the two connectors 721 at one bottom end of the baffle plate 71. Each first block 41 of the driving shaft 40 is inserted into the first gap. A plurality of first screws 90 passes through the first screw hole 412 and the baffle plate 71 for connecting the driving shaft 40 to the baffle plate 71, so that the two connectors 721 are tightly assembled to the two first blocks 41 for sealing the first gap. Each second block 51 of the supporting shaft 50 is inserted into the second gap. A plurality of second screws 91 passes through the second screw hole 512 and the baffle plate 71 for connecting the supporting shaft 50 to the baffle plate 71, so that the two connectors 721 are tightly assembled to the two second blocks 51 for sealing the second gap. The sealing arrangement 72 has an elastic member 723 assembled to the two connectors 721. The elastic member 723 is made of a material which resists high temperature, high pressure, strong acid and strong base, such as a metallic material or a Teflon material. The elastic member 723 is formed as an annular shape or a C-shaped ring. In the embodiment of the present invention, the elastic member 723 is formed as an elliptical shape. Two ends of the elastic member 723 are received into the first gap or the second gap, so that the two ends of the elastic member 723 are clipped by the two first blocks 41 or the two second blocks 51. The elastic member 723 has a first width along a first direction and a second width along a second direction. The first direction is parallel to the short axis of the elliptical valve 70. The second direction is parallel to the long axis of the elliptical valve 70. The first width of the elastic member 723 is no more than the length along the short axis of the elliptical valve 70. The second width of the elastic member 723 is slightly longer than a length along the long axis of the elliptical valve 70 and the diameter of the inner circular wall 11 of the shell body 10. Under above arrangement, two edges along the first direction of the elastic member 723 are respectively clipped into the first gap and the second gap, so that the other edges are protruded from the connector 721. The two plates 7211 can be integrated with each other in other embodiment of the present invention. The connector 721 has an inner annular wall and an outer annular wall defined thereon. A receiving recess is formed on the inner annular wall of the connector 721, and an annular recess is formed on the outer annular wall of the connector 721. The periphery 711 of the baffle plate 71 is inserted into the receiving recess. A shape of the receiving recess corresponds to a shape of the periphery 711 of the baffle plate 71. A shape of the elastic member 723 corresponds to a shape of the annular recess when the elastic member 723 is assembled to the annular recess. Specifically, the sealing arrangement 72 includes a plurality of the connectors 721, the connectors 721 are detachably disposed annularly on two peripheral edges of two corresponding sides of the baffle plate 71, the connectors 721 are protrusive radially out of the baffle plate 71, the connectors 721 and the baffle plate 71 form a annular receiving recess, the elastic member 723 is disposed annularly within the receiving recess and protrusive radially out of the connectors 721.

Figure 4:
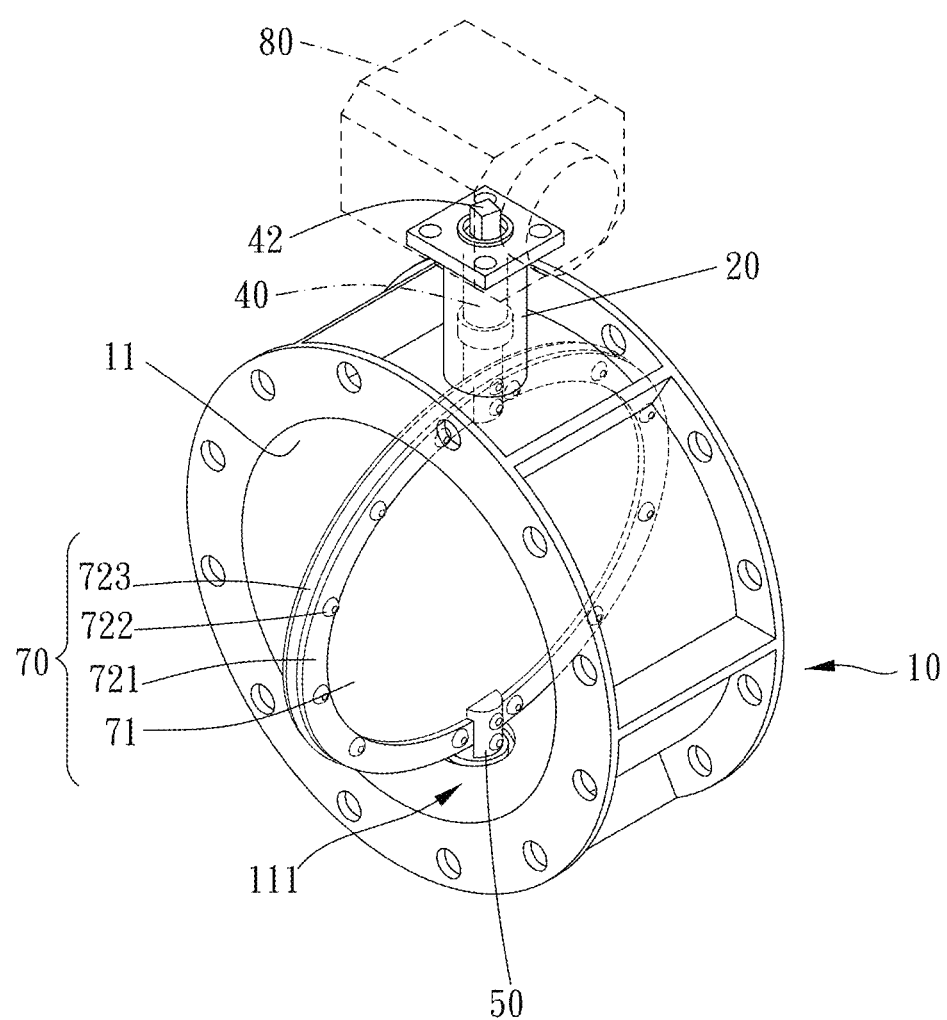
FIG. 4 is a perspective view of the present invention for showing the passage is opened by the elliptical valve.
Figure 5:
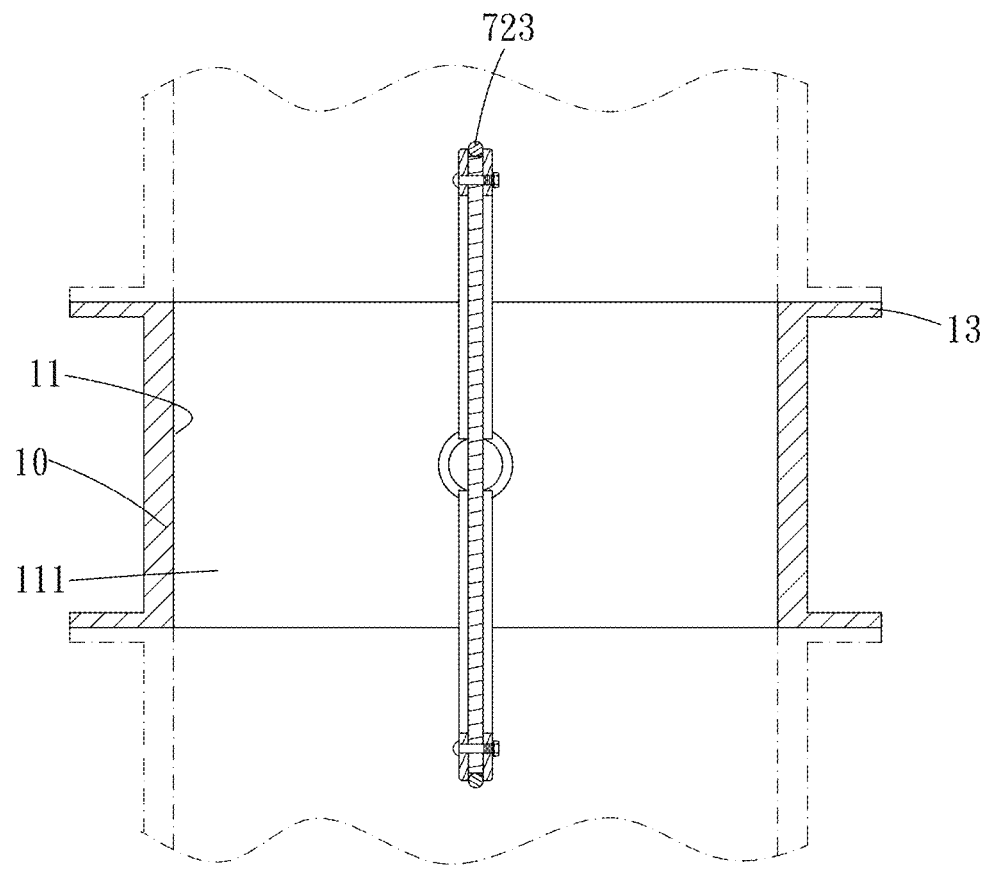
FIG. 5 is a cross-sectional view of the present invention for showing the passage is opened by the elliptical valve.

Referring to FIGS. 1-3A, the driving apparatus 80 drives the driving shaft 40 for rotating the elliptical valve 70 to a predetermined position so as to close the passage 111, so that the elastic member 723 would slightly deform and abut against the inner circular wall 11 of the shell body 10. An air or liquid of a working environment would not flow from one side of the elliptical valve 70 to another side of the elliptical valve 70 when the passage 111 is closed. Referring to FIGS. 4-5, the driving apparatus 80 drives the driving shaft 40 for rotating the elliptical valve 70 to another predetermined position for opening the passage 111, so that the elastic member 723 would not abut against the inner circular wall 11 of the shell body 10, the elastic member 723 recovers from said deformation for completely opening the passage 111. The air or liquid of the working environment would flow from one side of the elliptical valve 70 to another side of the elliptical valve 70 when the passage 111 is opened.

A user can control a rotating angle of the elliptical valve 70 via operating the driving apparatus 80, so that the flow controller of the invention provides a precise operation for controlling an air or liquid flow.

When the elliptical valve 70 is rotated, the elastic member 723 would be compressed to abut against the inner circular wall 11 of the shell body 10, so that the inner circular wall 11 would not be scratched by the elastic member 723. When the elliptical valve 70 is rotated to the predetermined position for closing the passage 111, the elastic member 723 tightly abuts against the inner circular wall 11 of the shell body 10 for completely closing the passage 111.

Furthermore, the elastic member 723 would not deform or be metamorphosed seriously in the working environment, so that the flow controller of the invention is suitable in a high temperature and high pressure environment.

The shape of the receiving recess corresponds to the shape of the periphery 711 of the baffle plate 71, so that the periphery 711 is tightly inserted into the receiving recess. Especially when a material of the connector 721 is the same as a material of the baffle plate 71, the connector 721 would be tightly connected with the baffle plate 71 in the working environment.

The shape of the elastic member 723 corresponds to the shape of the annular recess when the elastic member 723 is assembled to the annular recess, so that the elastic member 723 tightly abuts against the connector 721. Especially when a material of the connector 721 is the same as a material of the elastic member 723, the connector 721 would be tightly connected with the elastic member 723 in the working environment.

The connector 721 is assembled to the periphery 711 of the baffle plate 71 and is detachable, so that the connector 721 is adjustably assembled to the baffle plate 71. Therefore, the sealing arrangement 72 is suitable to variant sizes or shapes of the baffle plate 71.

Figure 6:
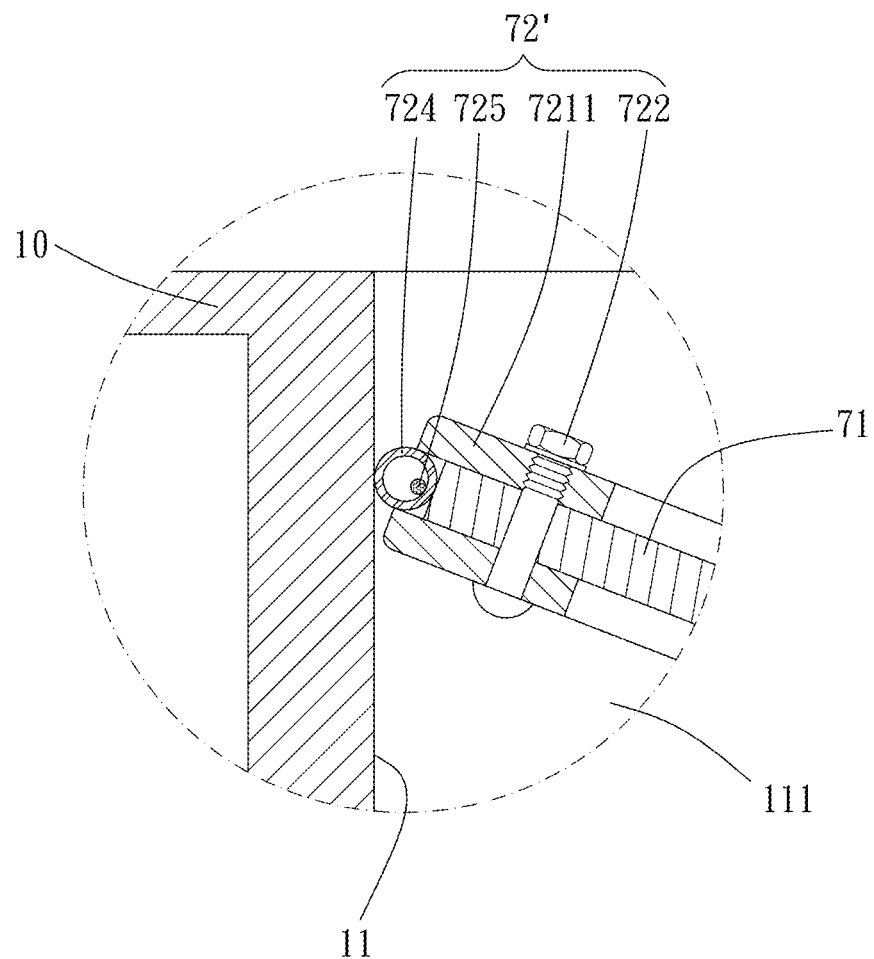
FIG. 6 is a partial cross-sectional view for showing a passage is closed by an elliptical valve according to an alternative embodiment of the present invention.

Referring to FIG. 6, in an alternative embodiment, an elastic member 72' may include an hollow Teflon ring 724 which is elastically disposed annularly within the receiving recess and protrusive radially out of the connectors 721, a line member 725 is disposed within and through the hollow Teflon ring 724, and the line member 725 tightens the hollow Teflon ring 724 to annularly against the baffle plate 71. The hollow Teflon ring 724 has a higher deformability and can provide better sealing effect.

Furthermore, the baffle plate 71 is formed as an elliptical shape. A length along a long axis of the baffle plate 71 is longer than the diameter of the inner circular wall 11 of the shell body 10. The baffle plate 71 can be rotated by the driving shaft 40, so that when the sealing arrangement 72 is not assembled to the baffle plate 71, the diameter of the inner circular wall 11 changes via thermal expansion or cold shrinkage; the length along the long axis of the baffle plate 71 also changes via thermal expansion or cold shrinkage; as a result, the periphery 711 of the baffle plate 71 completely abuts against the inner circular wall 11 of the shell body 10 for sealing the passage 111. A sealing efficiency of the elliptical valve 70 would be better when the sealing arrangement 72 is assembled to the baffle plate 71.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A flow controller comprising:
    a shell body, having an inner circular wall and an outer circular wall, a passage surrounded by the inner circular wall;
    a first supporting member assembled to the shell body, the first supporting member having an axle hole communicating with the passage;
    a driving shaft pivotally received in the axle hole;
    an elliptical valve pivotally assembled in the passage and connected with the driving shaft, including a baffle plate and a sealing arrangement, the baffle plate being elliptical and having a periphery, the baffle plate having a substantially fixed thickness, the sealing arrangement including a plurality of connectors and an elastic member; and
    wherein the elastic member is a Teflon ring member, the connectors are detachably disposed annularly on respective peripheral edges of two corresponding lateral sides of the baffle plate respectively, the to peripheral edges of the baffle plate are sandwiched by the connectors, the connectors and the baffle plate form round hollow portions respectively on the two corresponding lateral sides of the baffle plate, the connectors are protrusive radially out of the baffle plate so that the connectors and the baffle plate form a annular receiving recess circumferentially, the elastic member is disposed annularly within the receiving recess and protrusive radially out of the connectors, the elastic member has a thickness equal to or less than the thickness of the baffle plate;
    wherein the elliptical valve is rotated by the driving shaft for opening or closing the passage.

2. The flow controller as claimed in claim 1, wherein a cross-sectional of passage is formed as a circular shape.

3. The flow controller as claimed in claim 1, wherein a bottom end of the driving shaft extends into the passage, two first blocks are formed on the bottom end of the driving shaft, a first recess is defined between the two first blocks, a plurality of first screw holes are opened on each first block and communicate with the first recess, and the periphery is assembled to the first recess, a plurality of first screws pass through the first screw holes and the baffle plate for connecting the driving shaft to the baffle plate.

4. The flow controller as claimed in claim 1, further comprising a second supporting member and a supporting shaft, wherein the second supporting member is assembled to the shell body, the second supporting member has a through hole communicating with the passage, and the supporting shaft is pivotally received in the through hole and connected with the elliptical valve.

5. The flow controller as claimed in claim 4, wherein a top end of the supporting shaft extends into the passage, two second blocks are formed on the top end of the supporting shaft, a second recess is defined between the two second blocks, a plurality of second screw holes are opened on each second block and communicate with the second recess, the periphery is assembled to the second recess, and a plurality of second screws pass through the second screw holes and the baffle plate for connecting the supporting shaft to the baffle plate.

6. The flow controller as claimed in claim 1, wherein the connectors are plates, the plates are connected to the baffle plate via a plurality of fasteners, and the elastic member is received between the plates.

7. The flow controller as claimed in claim 1, wherein a first gap is formed between the connectors, a bottom end of the driving shaft is received in the first gap and connected to the baffle plate, and the connectors are tightly assembled to the bottom end of the driving shaft for sealing the first gap.

8. The flow controller as claimed in claim 1, wherein the elastic member includes an hollow Teflon ring which is elastically disposed annularly within the receiving recess and protrusive radially out of the connectors, a line member is disposed within and through the hollow Teflon ring, and the line member tightens the hollow Teflon ring to annularly against the baffle plate.

9. The flow controller as claimed in claim 8, wherein a diameter of the line member is less than ½ of an inner diameter of the hollow Teflon ring.

10. The flow controller as claimed in claim 8, wherein the line member is entirely non-protrusive out of the connectors radially.

\* \* \* \* \*